US009797325B2

United States Patent
Korenaga

(10) Patent No.: US 9,797,325 B2
(45) Date of Patent: Oct. 24, 2017

(54) APPARATUS FOR CONTROLLING AN INTERNAL COMBUSTION ENGINE

(71) Applicant: TOYOTA JIDOSHA KABUSHIKI KAISHA, Toyota-shi, Aichi-ken (JP)

(72) Inventor: Shingo Korenaga, Shizuoka (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 143 days.

(21) Appl. No.: 14/686,030

(22) Filed: Apr. 14, 2015

(65) Prior Publication Data

US 2015/0300245 A1 Oct. 22, 2015

(30) Foreign Application Priority Data

Apr. 16, 2014 (JP) ................. 2014-084730

(51) Int. Cl.
| | |
|---|---|
| *F02D 23/00* | (2006.01) |
| *F02D 41/04* | (2006.01) |
| *F02D 41/02* | (2006.01) |
| *F02D 41/14* | (2006.01) |
| *F02D 37/02* | (2006.01) |
| *F02D 41/00* | (2006.01) |
| *F02B 37/18* | (2006.01) |

(52) U.S. Cl.
CPC .............. *F02D 41/04* (2013.01); *F02B 37/18* (2013.01); *F02D 37/02* (2013.01); *F02D 41/0007* (2013.01); *F02D 41/025* (2013.01); *F02D 41/0255* (2013.01); *F02D 41/1475* (2013.01); *F02D 2200/0802* (2013.01); *Y02T 10/144* (2013.01); *Y02T 10/26* (2013.01)

(58) Field of Classification Search
CPC ...... F02B 37/18; F02B 37/183; F02B 37/186; F02B 37/02; F02B 25/00; F02D 41/04; F02D 41/0255; F02D 41/025; F02D 41/1475
USPC .................................................... 60/603, 285
See application file for complete search history.

(56) References Cited

U.S. PATENT DOCUMENTS

| | | | |
|---|---|---|---|
| 2003/0209009 A1* | 11/2003 | Chamoto | ............ F02D 41/0007 60/285 |
| 2009/0292446 A1 | 11/2009 | Tanaka | |
| 2012/0279216 A1* | 11/2012 | Otsuka | ................ F02D 41/0007 60/602 |
| 2015/0308364 A1* | 10/2015 | Hojo | .................... F02D 41/0255 60/285 |

FOREIGN PATENT DOCUMENTS

| | | | |
|---|---|---|---|
| JP | 2006274963 A | * | 10/2006 |
| JP | 2007-332867 A | | 12/2007 |
| JP | 2008-095542 A | | 4/2008 |

* cited by examiner

*Primary Examiner* — Ngoc T Nguyen
(74) *Attorney, Agent, or Firm* — Andrews Kurth Kenyon LLP

(57) ABSTRACT

A control apparatus for an internal combustion engine is provided. The control apparatus includes a turbocharger, a bypass passage, a wastegate valve, a catalyst device and a controller. The controller sets the wastegate valve to a closed state in a case where a warm-up execution condition is established, and performs A/F oscillation for increasing or decreasing the fuel injection amount so that lean combustion and rich combustion are alternately performed in a case where the temperature in the exhaust passage upstream of the turbocharger is beyond a predetermined reference value.

7 Claims, 9 Drawing Sheets

APPARATUS FOR CONTROLLING AN INTERNAL COMBUSTION ENGINE

CROSS-REFERENCES TO RELATED APPLICATIONS

This application claims the benefit of Japanese Patent Application No. 2014-084730, filed Apr. 16, 2014, which is hereby incorporated by reference wherein in its entirety.

BACKGROUND OF THE INVENTION

Field of the Invention

The present invention relates to a control apparatus for an internal combustion engine, and relates particularly to an apparatus that has a function for controlling a fuel injection amount in order to accelerate warm-up of a catalyst.

Description of the Related Art

Conventionally, immediately after cold start of an internal combustion engine, a fuel injection amount is controlled in order to rapidly raise the temperature of a catalyst used for exhaust emissions control until an activation temperature is reached. According to an apparatus disclosed in, for example, Japanese Patent Laid-Open No. 2008-095542, a wastegate valve located along a bypass passage used for bypassing a turbocharger is opened at the start of an internal combustion engine to raise the temperature of a catalyst, and when the catalyst temperature has reached a predetermined value at which the combustible components of exhaust gas can be burnt, the wastegate valve is closed, and at the same time, dither control for alternately repeating the increase and the decrease of the fuel injection amount is performed (A/F oscillation in the present invention). When as the result of the dither control, oxygen is supplied by lean combustion, and combustible components, such as CO (carbon monoxide), is supplied by rich combustion, the oxidation reaction of CO in the catalyst is enhanced, the catalyst is heated by heat generation due to the oxidation reaction, and warm-up of the catalyst is accelerated. Since the execution of the dither control is permitted only in a case where the catalyst temperature is a predetermined level or higher, and since the exhaust gas is stirred by a gas mixture flowing through the turbocharger during the dither control, slipping of unburned components, such as CO and HC, through the catalyst can be suppressed.

According to Japanese Patent Laid-Open No. 2007-332867, in a case where the amount of spark retard is at a predetermined value or lower, an apparatus that performs dither control adjusts the wastegate valve to an opening direction. When the wastegate valve is controlled to an opening direction, the flow rate of exhaust gas to the turbocharger is reduced, and therefore, the increase in the turbine rotational speed of the turbocharger is suppressed during the rich combustion, and the torque output variation can be suppressed.

However, according to the apparatus proposed in Japanese Patent Laid-Open No. 2008-095542, when the wastegate valve is closed and the dither control is started after the catalyst temperature has reached the predetermined level, immediately afterwards, a delay occurs in the activation of the catalyst because the heat of the exhaust gas is transferred to the turbocharger, and unburned components, such as CO and HC, are slipped out through the catalyst, so that emission is degraded. Further, for the apparatus proposed in Japanese Patent Laid-Open No. 2007-332867, there is no means provided to solve a problem caused by the heat being transferred to the turbocharger when the catalyst is to be activated by starting dither control.

SUMMARY OF THE INVENTION

The present invention is proposed to solve the above described shortcomings, and one objective of the present invention is to suppress a delay in activation of a catalyst that is caused by the heat of exhaust gas being transferred to a turbocharger.

According to a first aspect of the present invention, an apparatus for controlling an internal combustion engine, comprising a turbocharger, a bypass passage that bypasses an exhaust passage to connect an upstream side of the turbocharger to a downstream side thereof, a wastegate valve arranged in the bypass passage, a catalyst device arranged in the exhaust passage downstream of the turbocharger, and a controller programmed to control the internal combustion engine and the wastegate valve, further comprising:

means for obtaining a temperature in the exhaust passage upstream of the turbocharger;

wherein the controller is further programmed to set the wastegate valve to a closed state in a case where a warm-up execution condition is met, and to perform A/F oscillation for oscillating an air-fuel ratio so that lean combustion and rich combustion are alternately performed, in a case where the temperature in the exhaust passage upstream of the turbocharger is beyond a predetermined reference value.

According to this aspect, in a case where the warm-up execution condition is met, first, the wastegate valve is set to the closed state, and in a case where the temperature in the exhaust passage upstream of the turbocharger is beyond the predetermined reference value, the A/F oscillation is performed to oscillate the air-fuel ratio, so that lean combustion and rich combustion are alternately performed. Therefore, a reaction of lean and rich gases on the upstream side of the turbocharger can be accelerated. As a result, the temperature of the turbocharger can be rapidly increased, and a delay in activation of the catalyst due to absorption of heat by the turbocharger can be suppressed.

According to another aspect of the present invention, the apparatus for controlling an internal combustion engine further comprises: means for detecting a reaction state of rich gas with lean gas on the upstream side of the turbocharger, and the controller is further programmed to control, during the A/F oscillation, an opening degree of the wastegate valve based on the reaction state.

According to this aspect, since the opening degree of the wastegate valve is controlled (i.e., an opening movement is permitted) during the A/F oscillation based on the reaction state, the thermal energy generated in a case where a large amount of reaction is produced on the upstream of the turbocharger can be effectively employed for warming up the catalyst. Further, when the reaction on the upstream of the turbocharger is of a small amount (i.e. low), the wastegate valve can be adjusted in a closing direction in order to obtain the stability of the reaction, or in a case where the reaction is of a large amount (i.e. high), the wastegate valve can be adjusted in an opening direction to raise the temperature of the catalyst.

According to an additional aspect of the present invention, the apparatus for controlling an internal combustion engine further comprises means for detecting a reaction state of rich gas with lean gas on the upstream side of the turbocharger, and the controller is further programmed to control, during the A/F oscillation, an amplitude of the air-fuel ratio for the A/F oscillation based on the reaction state.

According to this aspect, since the amplitude of the air-fuel ratio is appropriately controlled based on the reaction state, a suitable reaction can be obtained.

Preferably, the means for detecting the reaction state detects the reaction state based on the temperature that is obtained, for the exhaust passage on the upstream side of the turbocharger, by means for obtaining a temperature. Further, the means for detecting the reaction may employ a fluctuation of the air-fuel ratio in exhaust gas to detect the reaction. According to these aspects, effects anticipated for the present invention can be obtained by employing simple measures.

Further features of the present invention will become apparent from the following description of exemplary embodiments (with reference to the attached drawings).

DESCRIPTION OF THE EMBODIMENTS

Figure 1:
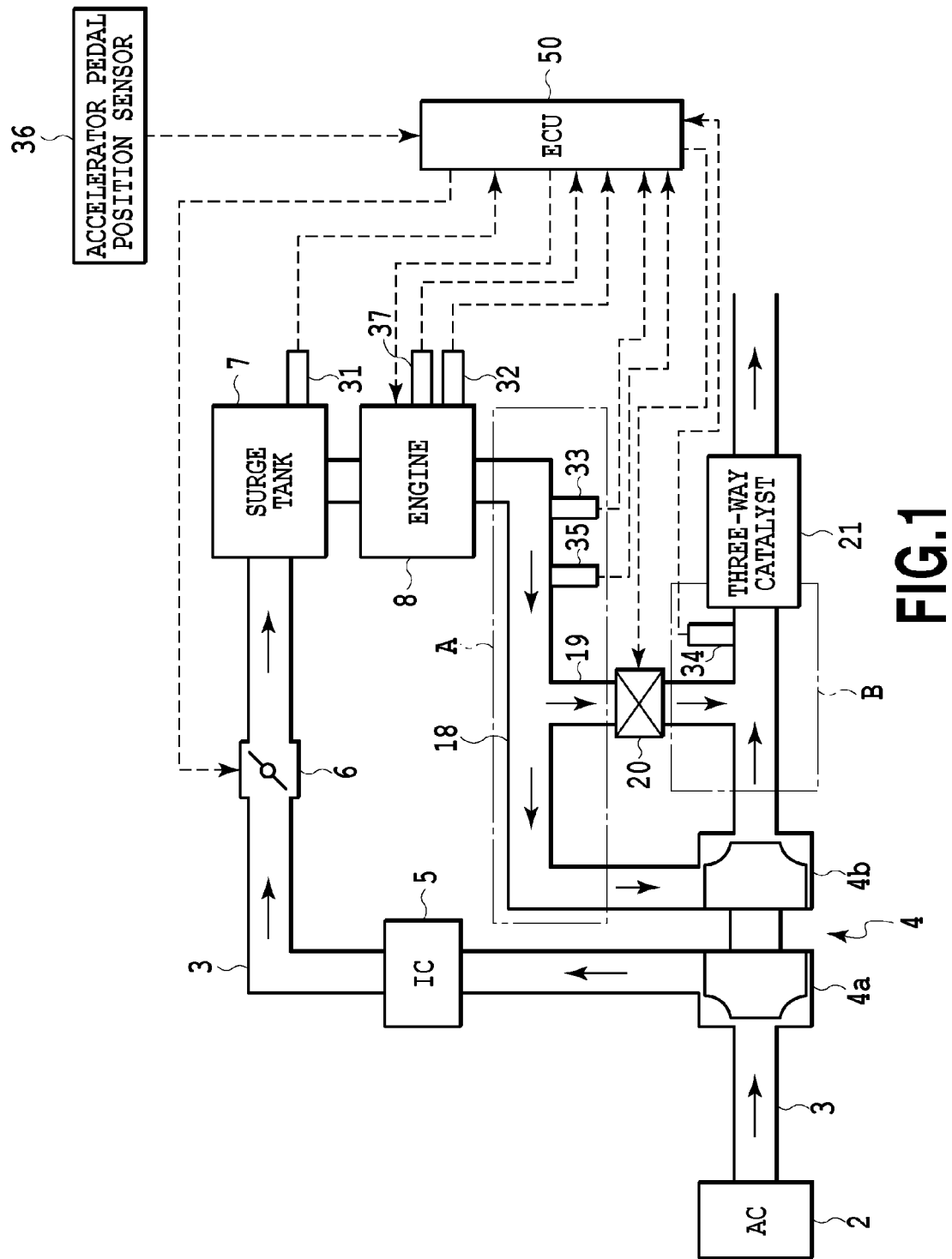
FIG. 1 is a schematic diagram illustrating the arrangement of a vehicle for which a control apparatus for an internal combustion engine according to the present invention is applied.

The preferred embodiments of the present invention will now be described while referring to the drawings.
[First Embodiment]
[General Arrangement]

FIG. 1 is a schematic diagram showing the arrangement of a vehicle, for which a control apparatus for an internal combustion engine according to a first embodiment of the present invention is applied. In FIG. 1, solid line arrows indicate the flow of gas, and dashed line arrows indicate input/output of signals.

In FIG. 1, a vehicle includes an air cleaner (AC) 2, an intake passage 3, a turbocharger 4, an intercooler (IC) 5, a throttle valve 6, a surge tank 7, an engine (internal combustion engine) 8, an exhaust passage 18, a bypass passage 19, a wastegate valve 20, a three-way catalyst 21, an intake air pressure sensor 31, a water temperature sensor 32, an oxygen sensor 33, an A/F sensor 34, an exhaust gas temperature sensor 35, an accelerator pedal position sensor 36, a crank angle sensor 37 and an ECU (Electronic Control Unit) 50. The engine 8 is an in-line, four-stroke, reciprocating gasoline engine.

The air cleaner 2 filtrates air (intake air) obtained from the outside, and supplies the filtrated air to the intake passage 3. A compressor 4a of the turbocharger 4 is located in the intake passage 3, and the intake air is compressed by rotation of the compressor 4a (pressure-charging). The intercooler 5 for cooling the intake air and the throttle valve 6 for adjusting the amount of intake air to be supplied to the engine 8 are also arranged along the intake passage 3.

The intake air that has passed the throttle valve 6 is temporarily stored in the surge tank 7 arranged along the intake passage 3, and is thereafter introduced into a plurality of cylinders (not shown) included in the engine 8. The engine 8 burns, inside the cylinders, a gas mixture of the supplied intake air and a fuel, and generates power. The exhaust gas generated by combustion in the engine 8 is discharged to the exhaust passage 18. The engine 8 controls the ignition timing, the fuel injection amount and the fuel injection timing based on control signals received from the ECU 50.

Figure 2:
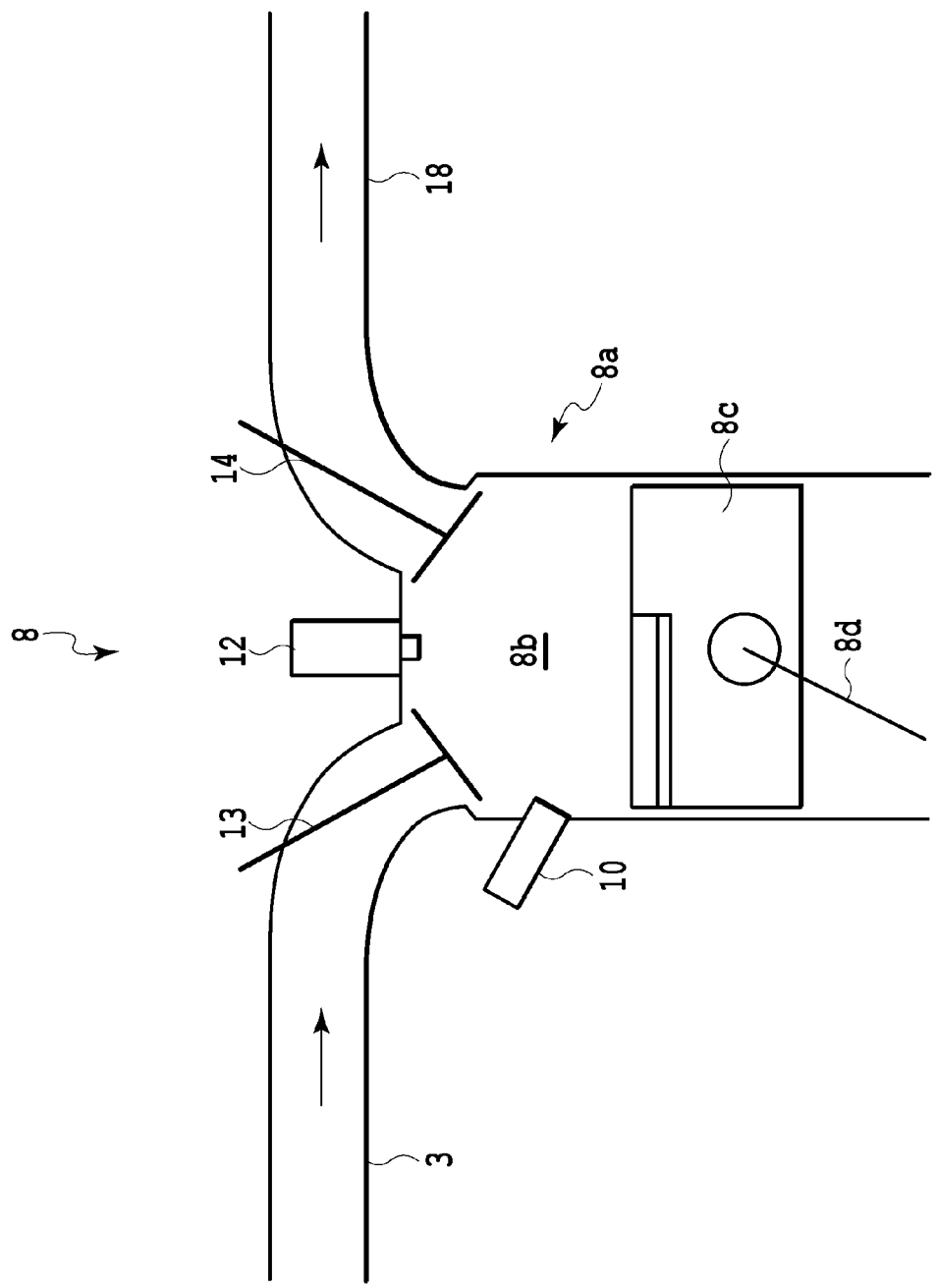
FIG. 2 is a schematic diagram showing the structure of an engine.

The structure of the engine 8 will be specifically described while referring to FIG. 2. The engine 8 includes a cylinder 8a, a fuel injection valve 10, an ignition plug 12, an intake valve 13 and an exhaust valve 14 as main components. In FIG. 2, only one cylinder 8a is illustrated for the convenience of the explanation, but actually, the engine 8 includes a plurality of cylinders 8a.

The fuel injection valve 10 is provided for the cylinder 8a to inject fuel directly to a combustion chamber 8b of the cylinder 8a (cylinder injection). The fuel injection valve 10 is controlled based on a control signal received from the ECU 50. That is, the fuel injection amount is controlled by the ECU 50. It should be noted that the structure of the engine 8 is not limited to a structure using the fuel injection valve 10 that performs cylinder injection (direct injection), and the engine 8 maybe provided by using a fuel injection valve that performs port injection.

The intake air is supplied to the combustion chamber 8b of the cylinder 8a through the intake passage 3, and also, fuel is supplied through the fuel injection valve 10. In the combustion chamber 8b, a gas mixture of the supplied intake air and the fuel is burnt through ignition by the ignition plug 12. At this time, a piston 8c is reciprocated by combustion, and this reciprocal movement is transmitted to a crankshaft (not shown) through a connecting rod 8d to rotate the crankshaft. The ignition plug 12 is controlled in accordance with a control signal supplied by the ECU 50. That is, the ignition timing is controlled by the ECU 50.

An intake valve 13 and an exhaust valve 14 are also arranged for the cylinder 8a. The intake valve 13 is opened or closed to allow or inhibit communication of the intake passage 3 with the combustion chamber 8b. The exhaust valve 14 is open or closed to allow or inhibit communication of the exhaust passage 18 with the combustion chamber 8b.

Other components of the vehicle will be described referring again to FIG. 1. The exhaust gas emitted by the engine 8 rotates a turbine 4b of the turbocharger 4 located along the exhaust passage 18. The rotation torque of the turbine 4b is transmitted to the compressor 4a of the turbocharger 4, and the compressor 4a is rotated to compress the intake air that passes the turbocharger 4 (pressure-charging).

A bypass passage 19 is connected to the exhaust passage 18, and bypasses the turbocharger 4 to connect the upstream side and the downstream side of the turbocharger 4. A wastegate valve 20 is arranged along the bypass passage 19. When the wastegate valve 20 is fully closed, the exhaust gas is guided to the turbocharger 4, and does not flow through the bypass passage 19. On the contrary, when the wastegate valve 20 is fully open, the exhaust gas also enters the bypass passage 19. Therefore, the increase of the rotational speed of the compressor 4a is suppressed, and pressure-charging by the turbocharger 4 is suppressed. The wastegate valve 20 can be set at arbitrary opening degrees between the fully closed position and the fully open position. Opening and closing of the wastegate valve 20 is performed by the ECU 50. In a case where a motor is employed to adjust the opening of the wastegate valve 20, the opening degree of the wastegate valve 20 can be estimated based on a value of integration of drive output to the motor, or in a case where a pressure actuator that is operated by the intake manifold negative pressure is employed, the opening degree of the wastegate valve 20 can be estimated based on the driving pressure.

A three-way catalyst 21 that has a function of purifying exhaust gas is also provided along the exhaust gas 18. Specifically, the three-way catalyst 21 is formed of precious metal, such as platinum or rhodium, as an active component, and has a function of removing, for example, nitrogen oxide (NOx), carbon monoxide (CO) and hydrocarbon (HC) from the exhaust gas. Further, the performance of the three-way catalyst 21 for purifying the exhaust gas varies in accordance with the temperature of the catalyst 21. More specifically, the exhaust emission purification performance is improved when the temperature of the three-way catalyst 21 is around the activation temperature. Therefore, after the cold start, it is required that the temperature of the three-way catalyst 21 be raised to the activation temperature. The type of the catalyst is not limited to the three-way catalyst 21, and various types of catalysts maybe employed, and a catalyst that requires warm-up is especially appropriate.

An intake air pressure sensor 31 is provided for the surge tank 7, and detects the pressure of intake air. The intake air pressure corresponds to the pressure of an intake manifold. A water temperature sensor 32 detects the temperature (hereinafter called an "engine water temperature") of cooling water that cools down the engine 8. An oxygen sensor 33 is provided along the exhaust passage 18, and detects the concentration of oxygen in the exhaust gas. The oxygen sensor 33 has a property that the output value sharply changes with the stoichiometric ratio as a border, and in many cases, the output voltage is lower than a stoichiometric equivalent value when the air-fuel ratio of exhaust gas is on the lean side of stoichiometric, while the output voltage is higher than the stoichiometric ratio when the air-fuel ratio of exhaust gas is on the rich side of stoichiometric. An A/F sensor 34 is, for example, a hollow zirconia element in a U shape in cross section, and outputs a voltage signal having a magnitude generally proportional to the detected air-fuel ratio of exhaust gas. An exhaust gas temperature sensor 35 comprises a thermocouple and detects the temperature T of the exhaust passage 18 upstream the turbocharger 4 (i.e., upstream the turbine 4b). An accelerator pedal position sensor 36 detects the position of the accelerator pedal operated by a driver. A crank angle sensor 37 is located in the vicinity of the crankshaft of the engine 8, and detects crank angle. The values detected by theses sensors are transmitted as detection signals to the ECU 50.

The ECU 28 includes a CPU, a ROM, a RAM and an A/D converter (none of them shown). The ECU 50 performs internal control of the vehicle based on the values output by the various sensors in the vehicle. In this embodiment, the ECU 50 mainly exercises control for the wastegate valve 20 and for the fuel injection valve 10. Specifically, in a case where a predetermined warm-up execution condition is met, the ECU 50 first sets the wastegate valve 20 to the closed state, executes a retard of ignition timing, and performs an operation (hereinafter referred to as "A/F oscillation") so that the air-fuel ratio is oscillated to alternately switch between lean combustion and rich combustion. The A/F oscillation is performed because slipping of CO or HC through the catalyst is appropriately prevented while rapidly warming up catalyst. Furthermore, during the A/F oscillation, the ECU 50 controls the amplitude between the air-fuel ratios for rich combustion and for lean combustion (hereinafter, referred to as an "A/F amplitude").

[A/F Oscillation]

The A/F oscillation performed by the ECU 50 will now be described. In this embodiment, the A/F oscillation is performed for the purpose of rapid catalyst warm-up, for example, at the cold-start.

Figure 3:
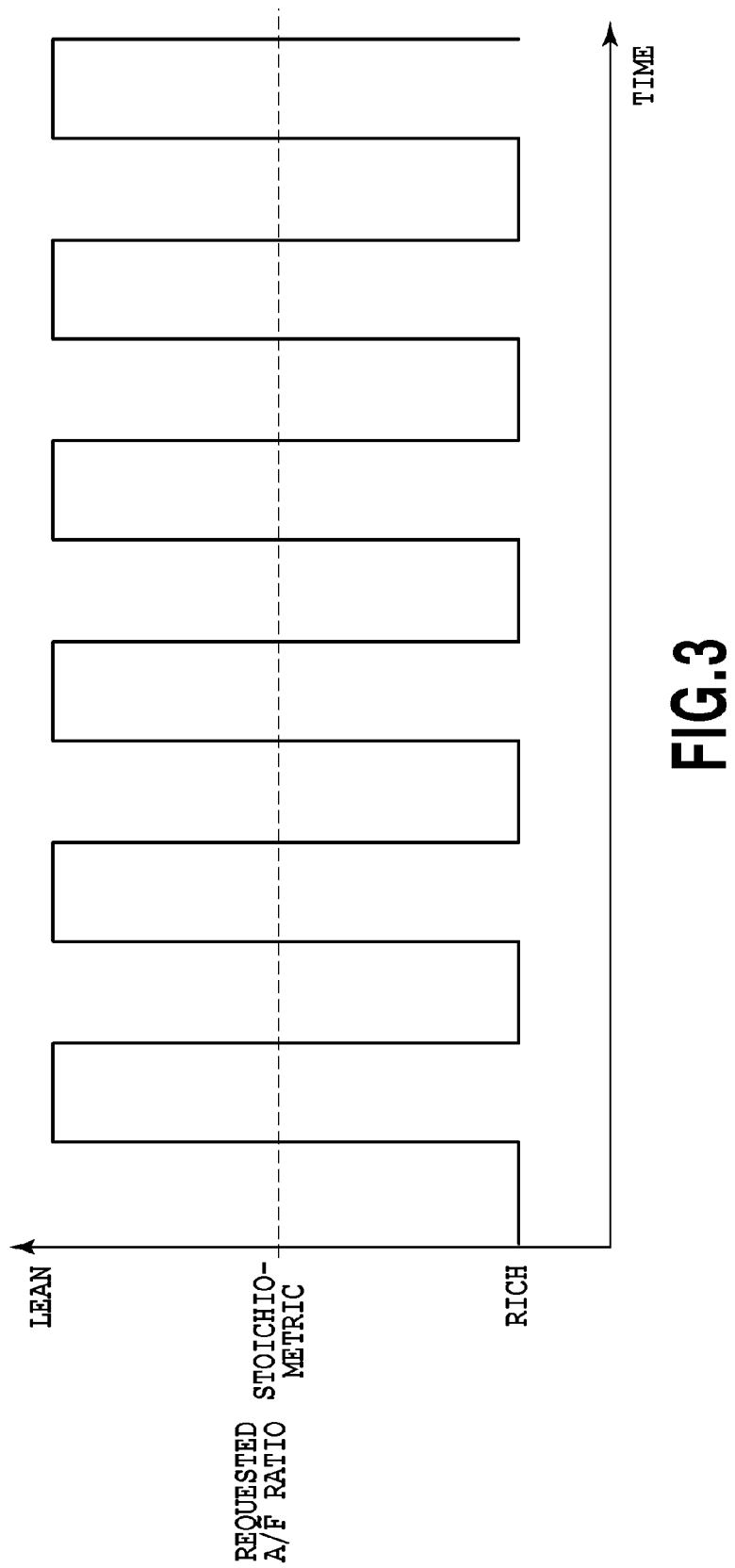
FIG. 3 is a time chart showing an example change for a requested A/F ratio during A/F oscillation.

The basic A/F oscillation will be described while referring to FIG. 3. The horizontal axis in FIG. 3 represents time, and the vertical axis represents an air-fuel ratio (A/F ratio). It should be noted that FIG. 3 is a graph showing the change of the target air-fuel ratio when the A/F oscillation is performed.

As shown in FIG. 3, at the A/F oscillation, oscillating of the air-fuel ratio is performed to alternately switch between lean combustion and rich combustion for the individual cylinders 8a and in the order of ignition. The air-fuel ratio is to be oscillated by increasing or decreasing the fuel injection amount. For a cylinder (lean cylinder) for which the air-fuel ratio is changed for lean combustion and for a cylinder (rich cylinder) for which the air-fuel ratio is changed for rich combustion, almost symmetrical values across a stoichiometric value (e.g., arbitrary values between, for example, 14.5 to 15 in weight ratio) are set as the air-fuel ratios (A/F ratios). However, the operation maybe performed, so that the air-fuel ratio is to be oscillated around the reference air-fuel ratio, other than the stoichiometric value.

In a case where the A/F oscillation is performed, lean gas (for example, $O_2$ (oxygen)) is supplied to the exhaust passage 18 during lean combustion, and rich gas (for example, CO (carbon monoxide)) is supplied during rich combustion. As a result, a reaction of CO with $O_2$ (oxidation reaction) in the exhaust passage 18 can be increased, and the three-way catalyst 21 is warmed by heat generated through the oxidation reaction to accelerate the catalyst warm-up (this reaction in the exhaust passage 18 may be hereafter referred to as "afterburning").

In this embodiment, since the engine 8 has four cylinders, i.e., an even number of cylinders, lean cylinders and rich cylinders are fixed. In a case where the ignition is to be performed in order of cylinder numbers "#1-#3-#4-#2", the air-fuel ratio or the combustion mode can be allocated as "rich for cylinder #1, lean for cylinder #3, rich for cylinder #4 and lean for cylinder #2". However, in a case where the present invention is applied for an engine with an odd number of cylinders, lean cylinders and rich cylinders maybe changed for each cycle. In case of a V-engine, allocation of lean cylinders and rich cylinders in the ignition order may be performed separately for each bank, or the allocation of cylinders may be performed for the two banks in the ignition order. Further, instead of the configuration wherein lean combustion and rich combustion are switched for the individual cylinders 8a in the ignition order, the configuration wherein switching of the combustion mode is performed for every multiple cylinders, or for every predetermined period of time, may be employed. In a case where the air-fuel ratio is switched for every multiple cylinders, or for every predetermined period of time, the waveform of the air-fuel ratio is not limited to a pulse-like waveform, but may be similar to a sinusoidal waveform, or another waveform, and an arbitrary waveform may be selected to obtain appropriate reaction.

In this embodiment, in a case where a rapid warm-up request is received, the ECU 50 sets the wastegate valve 20 to the closed state. This is in order to intercept the stream of exhaust gas that has passed through the bypass passage 19, and preheat the rotor and the case of the turbine 4b of the turbocharger 4 and the exhaust passage 18 nearby. Further, in a case where the temperature upstream of the turbocharger 4 is beyond a predetermined reference value, i.e., in a case where the temperature upstream of the turbocharger 4 has reached a temperature level at which burning of CO is enabled, the ECU 50 starts the A/F oscillation. Since the A/F oscillation is begun under the condition that the temperature upstream of the turbocharger 4 exceeds the predetermined reference value, combustion of CO generated by the A/F oscillation can be performed, with a higher probability, in an area A (see FIG. 1) upstream of the turbocharger 4 (i.e., a reaction of CO with $O_2$ can be obtained with a higher probability). Furthermore, since the A/F oscillation is performed in the state wherein the wastegate valve 20 has been set to the fully closed state, introduction of exhaust gas to the bypass passage 19 can be inhibited, and therefore, all of the exhaust gas generated during the A/F oscillation can be supplied to the turbocharger 4, and the temperature of the turbocharger 4 can be quickly raised. Additionally, since the rotational speed of the turbine 4b is increased, rich gas and lean gas can be efficiently mixed by the turbine 4b.

Moreover, in this embodiment, the ECU 50 changes the A/F amplitude for the A/F oscillation based on the temperature of the exhaust passage 18 upstream of the turbocharger 4. Specifically, in accordance with the temperature upstream of the turbocharger 4, the ECU 50 sets a difference of a fuel injection amount for the lean cylinders and a difference of a fuel injection amount for the rich cylinders, from the median of the two fuel injection quantities, respectively. For example, when the temperature upstream of the turbocharger 4 becomes low, the A/F amplitude is changed to a smaller value. Since in a case where the temperature upstream of the turbocharger 4 is too low, it is assumed that a large amount of reaction upstream of the turbocharger 4 is not produced, the A/F amplitude is reduced in this manner to accelerate the reaction. Thus, the proper state of the reaction upstream of the turbocharger 4 can be maintained.

In this embodiment, a temperature T of an area A upstream of the turbocharger 4 is directly detected by arranging, upstream of the turbocharger 4, the exhaust gas temperature sensor 35. The temperature T may be estimated based on at least one of the parameters indicating the operating state of a vehicle, for example, either an integrated value of intake air amount detected by an air flow meter 31 or fuel injection quantity. The estimated value can be corrected based on at least one of an in-cylinder pressure, the outside temperature Ta, the engine water temperature, the intake air temperature, the operating pattern (the over-time values of the required load and the engine rotational speed), exhaust gas temperature at the entrance of catalyst, and the exhaust-gas pressure at the area A. The in-cylinder pressure can be detected by an in-cylinder pressure sensor (not shown). The engine water temperature can be detected by a water temperature sensor 32. The intake air temperature can be detected by an intake-air temperature sensor 38. The exhaust-gas temperature at the entrance of catalyst can be detected by a catalyst entrance exhaust-gas temperature sensor provided at the vicinity B of an upstream end of the three-way catalyst 21. The exhaust gas pressure can be detected by a pressure sensor provided at the area A.

[Catalyst Warming-up Process]

Figure 4:
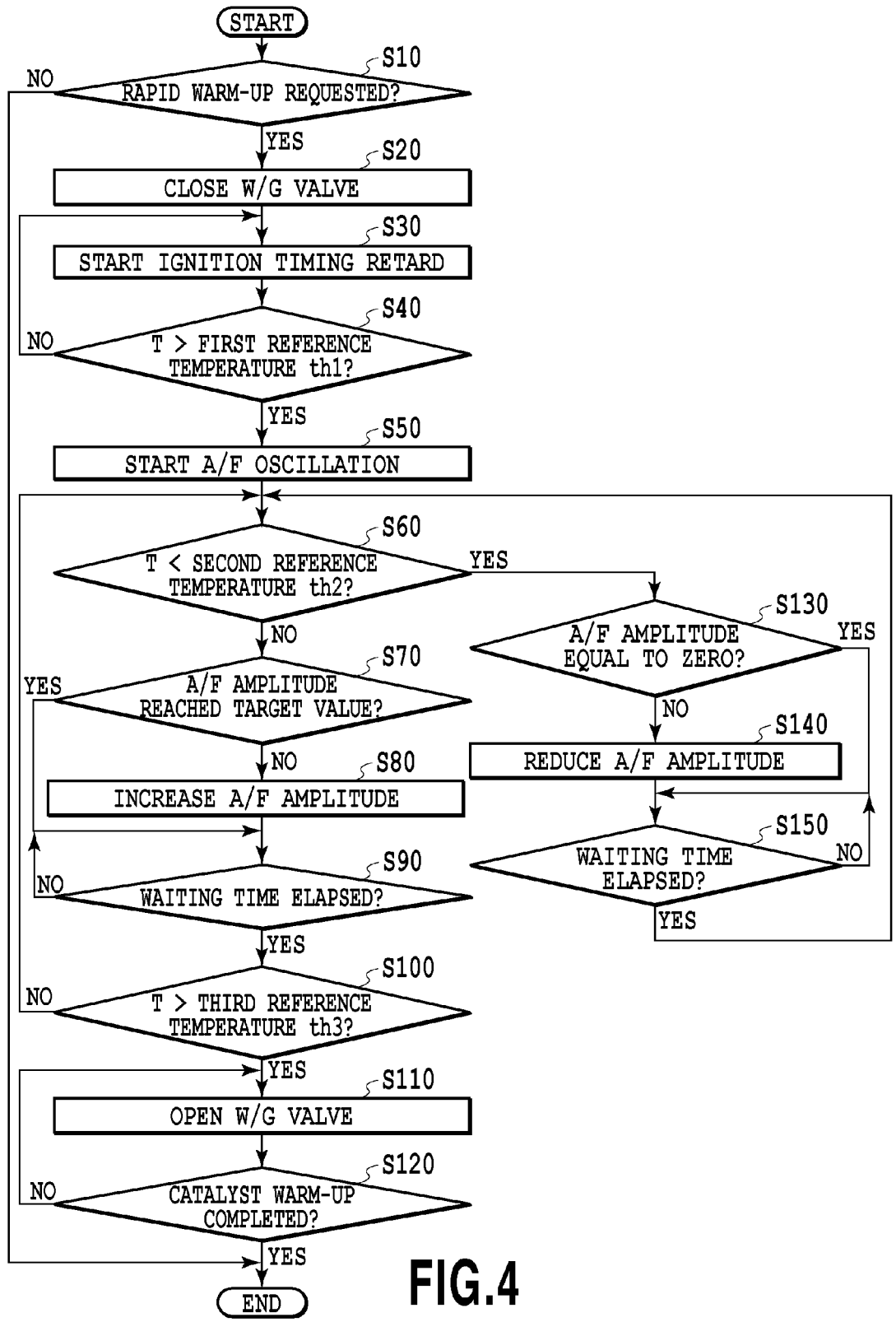
FIG. 4 is a flowchart showing the catalyst warming-up process performed for a first embodiment of the present invention.

FIG. 4 is a flowchart showing the routine of the catalyst warming-up process performed in this embodiment. This process is initiated by the ECU 50 under the condition that it determined, based on a manipulation input of an ignition switch (not shown) and an input from the crank angle sensor 37, that the engine 8 has been started. The process includes the A/F oscillation described above.

First, at step S10, the ECU 50 determines whether a rapid catalyst warm-up is requested. This determination is performed by examining the engine water temperature as to whether the temperature is lower than a predetermined reference value, and when the engine water temperature is lower than the reference value, it is ascertained that the rapid catalyst warm-up is requested. It should be noted that this determination can be performed based on at least one of the engine water temperature, the engine oil temperature and the catalyst temperature (all of these are detected values or estimated values). When a rapid catalyst warm-up is not requested (No at step S10), the process exits the routine.

When a rapid catalyst warm-up has been requested (Yes at step S10), a predetermined catalyst warm-up request flag is set ON, and the process advances to step 20. At step S20, the ECU 50 sets the wastegate valve 20 to the closed state in response to the ON operation of the catalyst warm-up request flag. Therefore, the wastegate valve 20 is fully closed, and the stream of the exhaust gas passing through the bypass passage 19 is intercepted. The process thereafter advances to step S30.

At step S30, the ECU 50 retards the ignition timing of the ignition plug 12 to a predetermined crank angle past the top dead point of compression. Due to this ignition timing retard, combustion is permitted at the point past the top dead point of compression that is closer to the exhaust stroke, and the exhaust gas of a high temperature can be introduced to the catalyst to accelerate the activation of the catalyst.

At step S40, the ECU 50 determines whether the temperature T in the exhaust passage 18 upstream of the turbocharger 4 is higher than a predetermined first reference temperature th1. The first reference temperature th1 is defined as a temperature at which combustion of CO of the exhaust gas (a reaction of $O_2$ with CO) is conducted at the minimum permissible level in a case where the A/F oscillation is started with the wastegate valve 20 being closed. When the temperature T upstream of the turbocharger 4 is equal to or lower than the first reference temperature th1 (No at step S40), the processes at steps S30 and S40 are repeated, and combustion in the ignition retarded state is continued until the temperature T becomes higher than the first reference temperature th1.

When the temperature T upstream of the turbocharger 4 is higher than the first reference temperature th1 (Yes at step S40), a predetermined request flag for the A/F oscillation is set ON, and the processing advances to step S50. At this time, it can be expected that combustion of CO (a reaction of $O_2$ with CO) will be appropriately conducted in a case where the A/F oscillation is started with the wastegate valve 20 being closed. Therefore, the ECU 50 thereafter begins the A/F oscillation in response to the ON operation of the A/F oscillation request flag (step S50).

As described above, lean combustion and rich combustion are alternately performed during the A/F oscillation. The A/F amplitude is gradually increased from 0 that is the initial value at the beginning of the A/F oscillation, and is set to, for example, a fixed target value. Further, the A/F amplitude is changed based on the temperature T upstream of the turbocharger 4. Therefore, the ECU 50 determines whether the thus obtained temperature T upstream of the turbocharger 4 is lower than a predetermined, second reference temperature th2 (step S60). The second reference temperature th2 is defined as a temperature at which afterburning of CO of the exhaust gas upstream of the turbocharger 4 (a reaction of $O_2$ with CO) is conducted below the minimum permissible level (afterburning is degraded). The second reference temperature th2 may be the same value as the first reference temperature th1, or may be a different value from the first reference temperature th1 (e.g., a value smaller than the first reference temperature th1).

In a case where the decision is Yes at step S60, i.e., the temperature T is lower than the second reference temperature th2, it is assumed that, after the A/F oscillation has been initiated, afterburning of CO of the exhaust gas (a reaction of $O_2$ with CO) upstream of the turbocharger 4 is below the minimum permissible level (afterburning is degraded). Therefore, so long as the A/F amplitude is not zero (S130), the ECU 50 reduces the amplitude of the air-fuel ratio by a predetermined amount (step S140). That is, the A/F amplitude that is smaller than the current amplitude by a predetermined amount is determined to be a target value, and the fuel injection valve 10 is controlled so as to inject the fuel injection amount corresponding to the updated A/F amplitude. Immediately after the ADFR oscillation has been started, degradation of afterburning tends to occur due to the excessively large A/F amplitude. Therefore, at step S140, in a case where the temperature T dropped immediately after the A/F oscillation has been started, the A/F amplitude is reduced so as to suppress the degradation of afterburning. When a predetermined waiting time has elapsed after the decrease at step 140 of the A/F amplitude (S150), the ECU 50 determines again whether the temperature T is lower than the second reference temperature th2 (step S60). The processes at step S60 to S150 are repeated, and the A/F amplitude is gradually reduced until the temperature T becomes equal to or higher than the second reference temperature th2.

On the other hand, in a case where the decision at step S60 is negative, i.e. the temperature T is equal to or higher than the second reference temperature th2, it is assumed that an afterburning is stably established. Therefore, the ECU 50 repeats increasing of the A/F amplitude by a predetermined amount (S80) and monitoring for a predetermined period of time (S90) until the A/F amplitude reaches the fixed target value (S70).

Subsequently, the ECU 50 determines whether the temperature T upstream of the turbocharger 4 is higher than a third reference temperature th3 that is designated in advance (step S100). The third reference temperature th3 is defined as a temperature at which an afterburning of CO of the exhaust gas (a reaction of $O_2$ with CO) during the A/F oscillation is stably established for the area A (see FIG. 1) upstream of the turbocharger 4, and at which the temperature of the turbocharger 4 has been appropriately raised. It is suitable that the third reference temperature th3 be higher than the second reference temperature th2. When the decision at step S100 is negative, i.e., the temperature T is equal to or lower than the third reference temperature th3, the processes at steps S60 to S90 and at steps S130 to S150 are repeated. Therefore, increasing of the A/F amplitude up to the target value (S70 and S80) and waiting (S90) are repeated until the temperature T rises beyond the third reference temperature th3.

When the decision at step S100 is affirmative, i.e., the temperature T upstream of the turbocharger 4 is higher than the predetermined third reference temperature th3, it is assumed that an afterburning (a reaction of $O_2$ with CO) upstream of the turbocharger 4 is stably established. Thus, the ECU 50 sets the wastegate valve 20 to the fully open state (S110) to increase the amount of the exhaust gas that bypasses the turbocharger 4 and flows toward the three-way catalyst 21. As a result, the energy input to the three-way catalyst 21 can be increased.

At the end, the ECU 50 determines whether the catalyst warming-up is completed (S120). This determination can be performed based on at least either a value of integration of the amounts of intake air detected by the air flow meter 31, or the estimated value or the detected value (by using a thermocouple for example) of the catalyst temperature, and in a case where these values have reached the predetermined reference values, an affirmative decision is made, and the routine is terminated.

Figure 5:
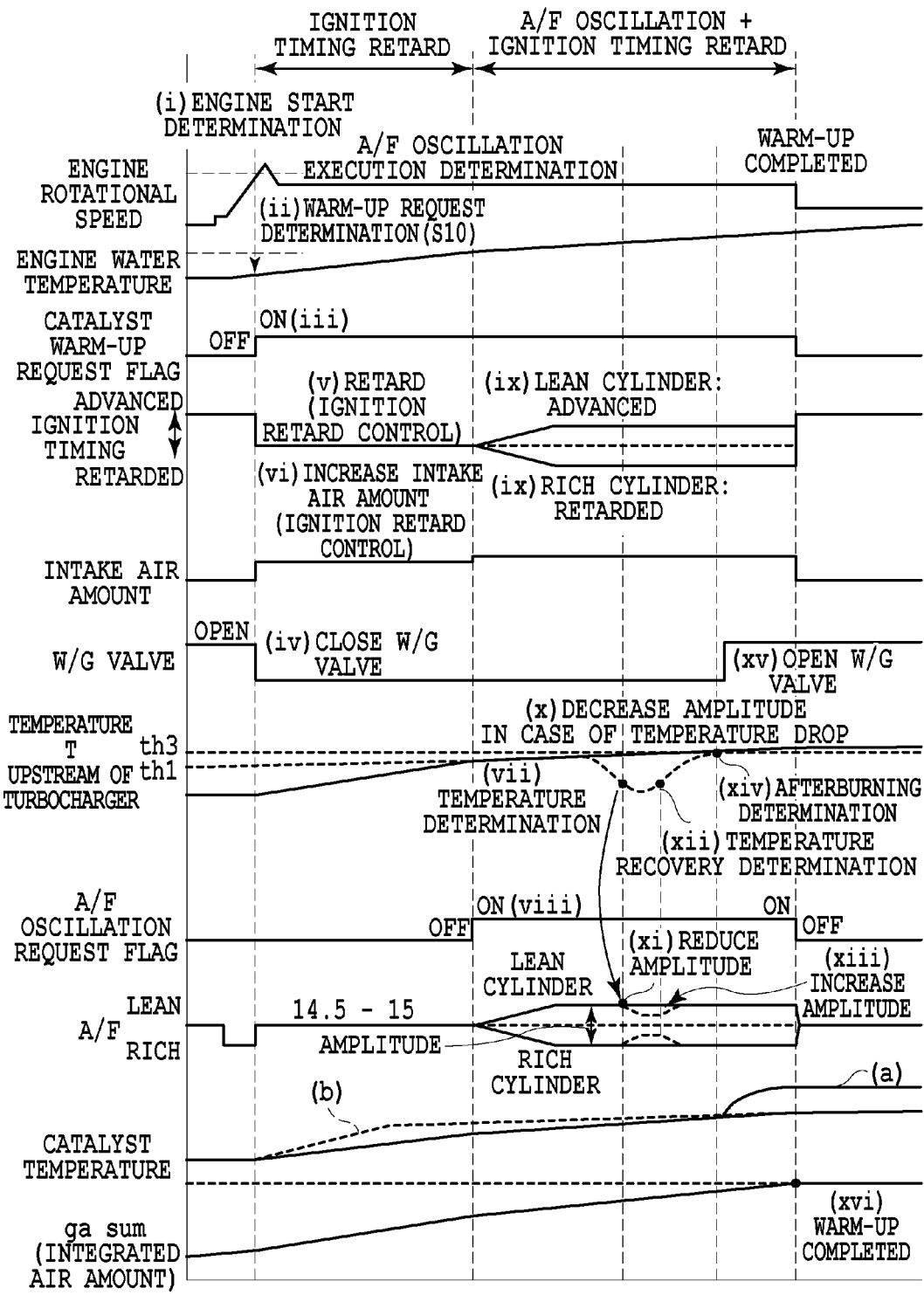
FIG. 5 is a time chart showing exemplary changes of individual parameters according to the first embodiment.

FIG. 5 is a timing chart showing the operating states of the individual sections when the above described catalyst warm-up process is performed. In FIG. 5, first, when the rotational speed of the engine 8 calculated based on the entry from the crank angle sensor 37 exceeds a reference value for determination of the engine startup, it is ascertained that the engine 8 has been started (i). Subsequently, based on the engine water temperature, a determination is performed on whether a rapid catalyst warm-up request is issued (ii) (S10). Subject to the affirmative decision at step S10 (iii), a catalyst warm-up request flag is set ON. The ON state of this flag indicates that the catalyst warm-up request is standing, and is maintained until the catalyst warm-up process is completed.

In response to the ON operation of the catalyst warm-up request flag, a closing operation of the wastegate valve 20 (iv) is performed (S20). Further, retarding of the ignition timing (v) is initiated (S30), and following this, the opening of the throttle valve 6 is increased by the ECU 50, and the amount of intake air is increased (vi).

When the temperature T upstream of the turbocharger 4 is higher than the first reference temperature th1 (vii), the A/F oscillation request flag is set ON (viii), and the ON state of the flag is maintained until the catalyst warming-up process is completed. In response to the ON operation of the A/F oscillation request flag, the A/F oscillation is initiated (S50). Specifically, the A/F amplitude (i.e., a range provided by a difference of the air-fuel ratio for the lean cylinder and a difference of the air-fuel ratio for the rich cylinder, with respect to the median of the two ratios) is gradually increased from 0, and is set to a fixed target value (see the A/F ratio graph in FIG. 5). At the same time as the gradual increase of the A/F amplitude, the ignition timing of the lean cylinder is gradually advanced, while the ignition timing of the rich cylinder is gradually retarded (ix). This is because combustion for the lean cylinder is degraded due to lean air mixture, and combustion for the rich cylinder is favorably performed due to rich air mixture, and therefore, a difference of the torques between the these cylinders should be suppressed.

In a case where the temperature T upstream of the turbocharger 4 is lower than the second reference temperature th2 (x), the A/F amplitude is decreased (xi) (S140). Further, when it is determined, as the result of decrease of the A/F amplitude, that the temperature T is recovered to the second reference temperature th2 (xii) (S60), the A/F amplitude is increased (xiii) (S80).

When the temperature T upstream of the turbocharger 4 is higher than the third reference temperature th3 (S100) (xiv), the wastegate valve 20 is set to the fully open state ((xv), S110), and the amount of exhaust gas that bypasses the turbocharger 4 and is introduced to the three-way catalyst 21 is increased. As a result, the energy input to the three-way catalyst 21 is increased. Finally, when it is determined that the catalyst warm-up is completed (xvi) (S120), the catalyst warm-up request flag and the A/F oscillation request flag are set OFF, and the increase of intake air and of the A/F oscillation are terminated. As a result of the above described process, the catalyst temperature is rapidly raised. According to a conventional apparatus before the improvement of this invention is provided, the catalyst temperature is changed as indicated by a curve (b), and after the wastegate valve 20 is closed and the A/F oscillation is started, there is a possibility that the temperature will become even lower. In contrast, according to the present invention, immediately after the cold-start, the catalyst temperature varies as indicated by a curve (a), at a level lower than that for the conventional apparatus because of the heat capacity of the turbocharger 4, but after the operation for opening the wastegate valve 20 has been performed (xv), the input volume of heat is drastically increased, and therefore, the catalyst temperature is rapidly increased, without being decreased in the middle of the process.

As thus described, in the first embodiment, when the warm-up execution condition is established (S10), first, the wastegate valve 20 is set to the closed state (S20), and if the temperature T of the exhaust passage 18 upstream of the turbocharger 4 is beyond the predetermined reference value (the first reference temperature thl), the ECU 50 starts the A/F oscillation to increase or decrease the air-fuel ratio, so that lean combustion and rich combustion are to be alternately performed (S50). Therefore, in this embodiment, a reaction of lean gas with rich gas can be accelerated in the area A (see FIG. 1) of the exhaust passage 18 upstream of the turbocharger 4, and therefore, the temperature of the turbocharger 4 can be rapidly increased, and the delay of the activation of the catalyst due to absorption of heat by the turbocharger 4 can be prevented. It is conceivable that in the conventional A/F oscillation, a reaction of lean gas with rich gas takes place in an area B (see FIG. 1) in the exhausts passage 18 near the entrance of the three-way catalyst 21.

Furthermore, the control apparatus of this embodiment is programmed so that a reaction state of the rich gas with lean gas upstream of the turbocharger 4 is detected (S100), and the ECU 50 controls the opening degree of the wastegate valve 20 based on the reaction state (that is, allows the movement in an opening direction) (S110). Therefore, in a case where a large amount of reaction takes place upstream of the turbocharger 4, heat energy generated can be effectively employed to warm up the catalyst.

Moreover, in this embodiment, since the reaction state is detected based on the temperature in the exhaust passage 18 upstream of the turbocharger 4, the effects anticipated for the present invention can be obtained by employing simple measures.

Further, in this embodiment, a reaction state of rich gas with lean gas is detected upstream of the turbocharger 4 (S60), and based on the reaction state, the ECU 50 controls the amplitude of the air-fuel ratio during the A/F oscillation (S80 and S140). Therefore, a large amount of reaction can be produced by appropriately controlling the amplitude of the air-fuel ratio in accordance with the reaction state.

[Second Embodiment]

A second embodiment of the present invention will now be described. In the first embodiment described above, the wastegate valve 20 is set to the closed state after an afterburning determination has been made (Yes at S100) (S110). Instead of this configuration, a reaction state of rich gas with lean gas upstream of a turbocharger 4 may be detected, and during the A/F oscillation, the wastegate valve 20 may be set at arbitrary opening degrees in the middle of the degrees for the open state and the degrees for the closed state. Further, means for detecting the reaction state may employ a fluctuation of the air-fuel ratio in exhaust gas to detect the reaction state. The second embodiment employs these points as characteristics. Since the mechanical arrangement for the second embodiment is the same as that for the first embodiment, a detailed explanation for the corresponding components will be omitted by providing the same reference numerals.

Figure 6:
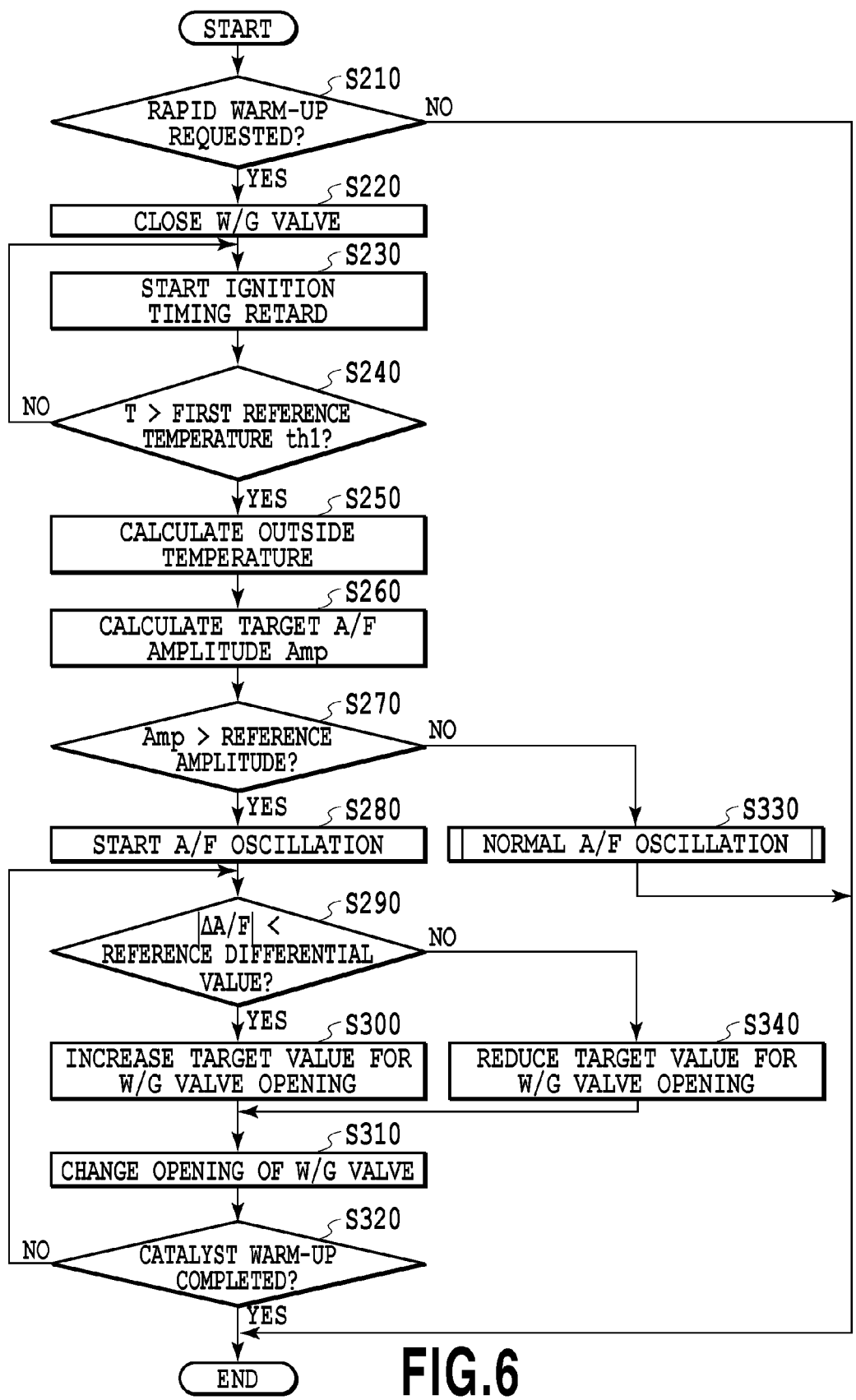
FIG. 6 is a flowchart showing the catalyst warming-up process performed for a second embodiment of the present invention.

The control performed in the second embodiment will now be described. In FIG. 6, the processes at steps S210 to S240 are the same as the processes at steps S10 to S40 for the first embodiment (FIG. 4).

At step S240, in a case where a temperature T upstream of a turbocharger 4 is higher than a first reference temperature th1 (Yes at step S240), the process advances to step S250. At step S250, an ECU 50 calculates the outside temperature. The calculation of the outside temperature can be performed based on a value detected by an intake air temperature sensor or an outside temperature sensor (neither of them shown). Then, the ECU 50 calculates a target A/F amplitude Amp based on the outside temperature (S260). This calculation is performed based on a predetermined function or map stored on the ROM of the ECU 50. Since thermal energy required to be supplied is increased as the outside temperature is low, it is appropriate that the target A/F amplitude Amp be increased.

Following this, the ECU 50 determines whether the target A/F amplitude Amp is greater than a predetermined reference amplitude (step S270). This reference amplitude is designated as an A/F amplitude that is sufficient for properly detecting a reaction state based on the fluctuation of the air-fuel ratio. When the decision at step S270 is negative, i.e., when the target A/F amplitude Amp is equal to or lower than the reference value, the ECU 50 performs a normal A/F oscillation (step S330). The normal A/F oscillation is an operation performed in the same manner as for the processes at steps S50 to S150 in the first embodiment.

In a case where the decision at step S270 is affirmative, i.e., the target A/F amplitude Amp is greater than the reference value, the processing advances to step S280. In this case, since the temperature T upstream of the turbocharger 4 is higher than the first reference temperature th1 (S240), it can be expected that, when the A/F oscillation is started while the wastegate valve 20 is maintained closed, combustion of CO (a reaction of $O_2$ with CO) can be appropriately performed upstream of the turbocharger 4. Therefore, the ECU 50 thereafter starts the A/F oscillation (step S280).

Figure 7:
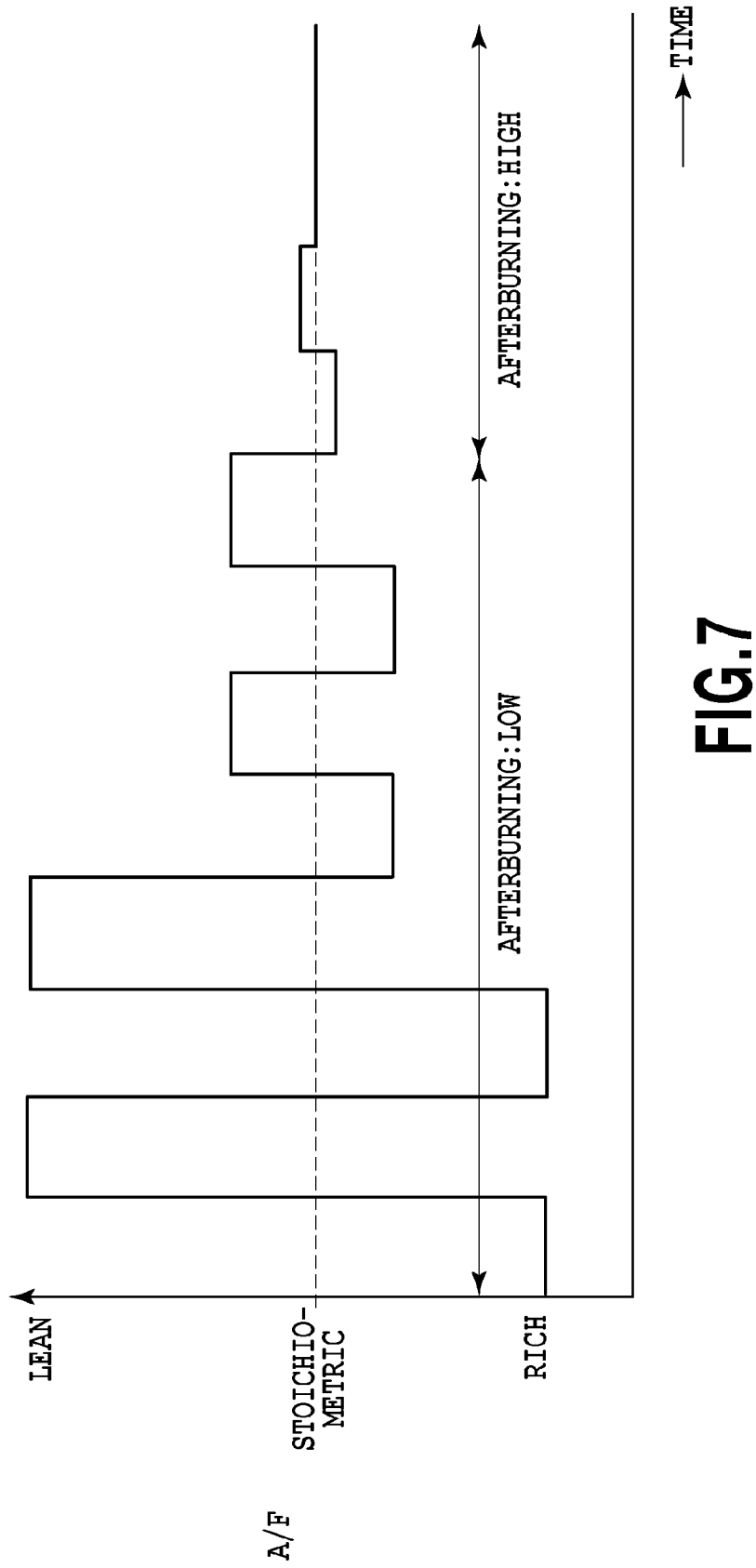
FIG. 7 is a time chart showing an example change of a detected A/F ratio in the second embodiment.

Subsequently, based on the change of the air-fuel ratio, the ECU 50 detects the state of CO combustion (a reaction of the $O_2$ with CO) in the exhaust passage 18 upstream of the turbocharger 4 (step S290). As shown in FIG. 7, when a large amount of combustion of CO (a reaction of $O_2$ with CO) is performed in the exhaust passage 18 upstream of the turbocharger 4, the amplitude of the air-fuel ratio at a downstream position where the A/F sensor 34 is located (near the entrance of the three-way catalyst 21) is comparatively small. Therefore, whether a large amount of combustion is performed can be determined based on the amplitude of the air-fuel ratio detected by the A/F sensor 34. Specifically, the ECU 50 reads, at each interval of ignition for adjacent cylinders, a value detected by the A/F sensor 34 based on a value detected by the crank angle sensor 37, subtracts the preceding value from the latest value to obtain an A/F differential value ΔA/F, and determines whether the absolute value of the differential value is smaller than a predetermined differential value. When the decision is affirmative, it is assumed that a large amount of combustion is performed, or when the decision is negative, it is assumed that a small amount of combustion is performed.

When the decision at step S290 is affirmative, i.e., when the absolute value of the A/F differential value ΔA/F is smaller than the reference value, it is assumed that a large amount of combustion is performed, and therefore, the ECU 50 changes the target opening degree value of the wastegate valve 20 to an increasing side by a predetermined amount (S300). Thereafter, the ECU 50 changes the opening degree of the wastegate valve 20 to match the value of the opening degree with the updated target value (S310).

When the decision at step S290 is negative, i.e. when the absolute value of the A/F differential value ΔA/F is equal to or greater than the reference differential value, it is assumed that combustion is of a small amount (i.e. low), and the ECU 50 changes the target opening value of the wastegate valve 20 to a reducing side by a predetermined amount (S340). When the opening of the wastegate valve 20 is too large, the pressure upstream of the turbocharger 4 is decreased. Therefore, when stable afterburning is not performed by the A/F oscillation (i.e. when the temperature and the pressure are low), there is a possibility that emission will be degraded by unsuccessful afterburning. The target value of the opening of the wastegate valve 20 is reduced at step S340 for increasing the pressure upstream of the turbocharger 4. The ECU 50 thereafter changes the opening degree of the wastegate valve 20 to match the opening value with the updated target value (S310).

Figure 8:
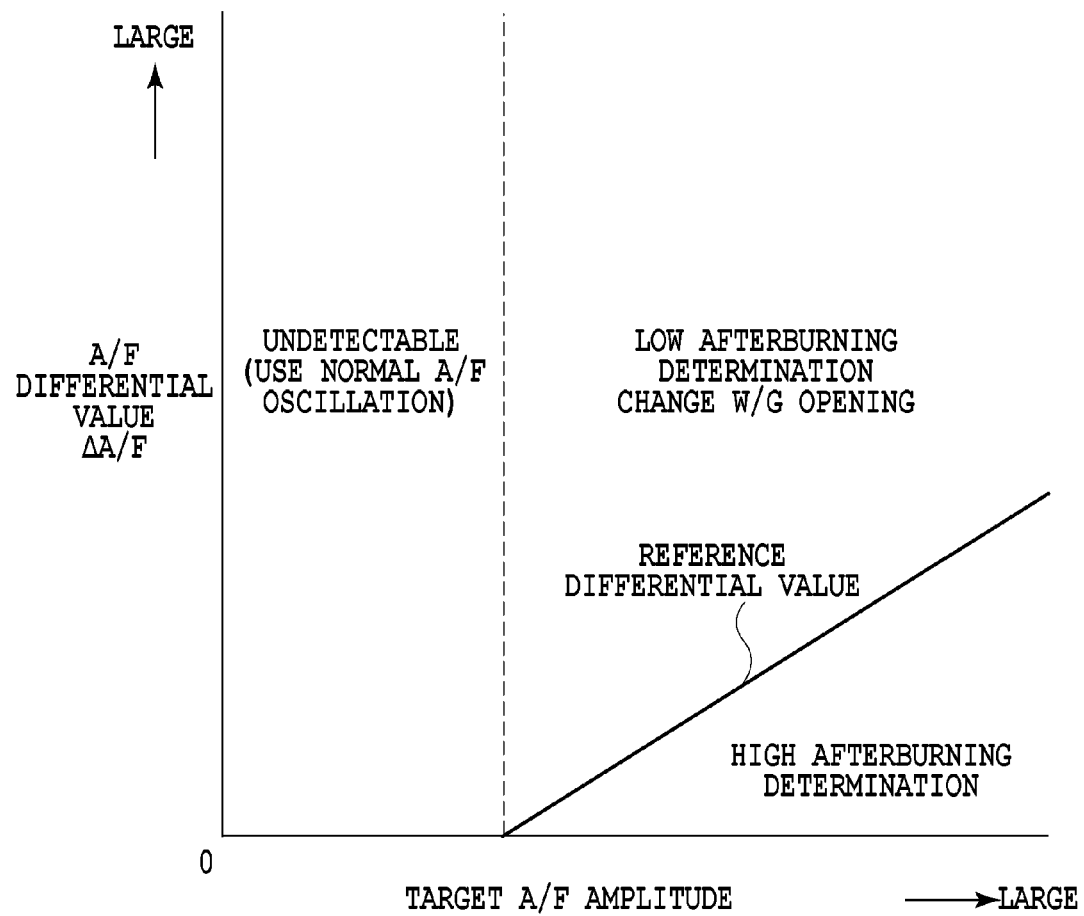
FIG. 8 is a graph showing an example for setting a reference differential value in the second embodiment.

Preferably, as shown in FIG. 8, the reference differential value employed at step S290 be 0 when the target A/F amplitude is equal to the reference amplitude, and be set to a large value as the target A/F amplitude is increased. In this case, at step S290, a determination is performed as to whether a ratio of the absolute value of the A/F differential value ΔA/F with respect to the amount of increase of the target A/F amplitude is below a predetermined value.

The processes at step S290 to S340 are repeated until the catalyst warm-up process is completed (S320). A determination whether the warm-up of the catalyst is completed can be performed in the same manner as the process at step S120 in the first embodiment. When the catalyst warm-up process is completed (Yes at step S320), this routine is terminated.

As thus described, according to the second embodiment, the ECU 50 detects a reaction state of rich gas with lean gas upstream of the turbocharger 4 (S290), and also based on the reaction state, controls the opening degree of the wastegate valve 20 during the A/F oscillation (S300, S310 and S340). Therefore, in the second embodiment, when reaction state is of a small amount (i.e. low) upstream of the turbocharger 4, the wastegate valve 20 is adjusted in a closing direction (S340) to obtain the stability of the reaction, and when reaction state is of a large amount (i.e. high), the wastegate valve 20 is adjusted in an opening direction (S310) to raise the temperature of the three-way catalyst 21.

Figure 9:
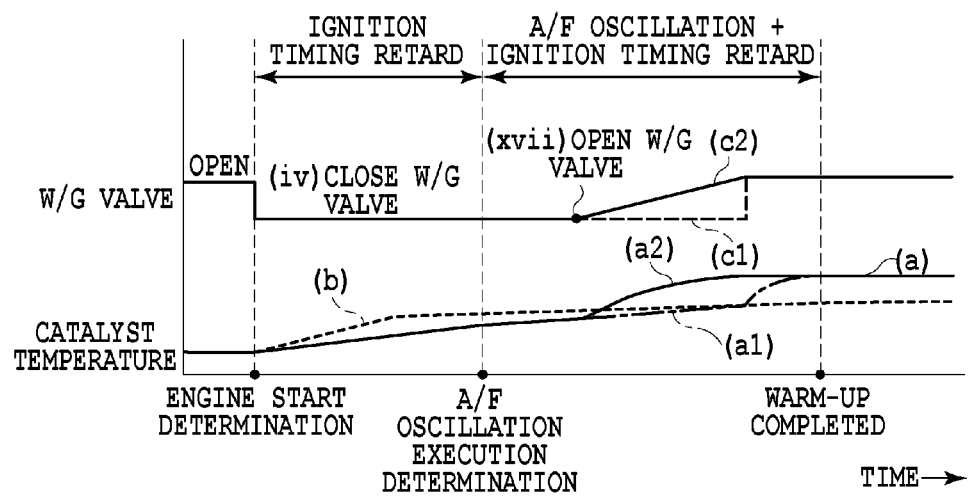
FIG. 9 is a time chart showing exemplary changes of individual parameters according to the second embodiment.

According to the second embodiment, since the opening degree of the wastegate valve 20 is gradually increased by repeating the processes at steps S290 to S320, the opening of the valve 20 changes as indicated by a solid line (c2) in FIG. 9. The opening degree of the wastegate valve 20 in the first embodiment is changed step by step, as indicated by a dotted line (c1) in FIG. 9, from the fully closed state to the fully open state in accordance with the afterburning determination performed based on the temperature T. In contrast, in the second embodiment, since the opening degree of the wastegate valve 20 is gradually changed as indicated by the solid line (c2) (xvii), the movement of the wastegate valve 20 less affects the stability of the combustion upstream of the turbocharger 4, and as a result, the operation for opening the wastegate valve 20 can be started at a comparatively early stage after the A/F oscillation is initiated (vii). Accordingly, the catalyst temperature can be increased (solid line (a2)) at the time earlier than the time for the change (two-dot chain line (a1)) in the first embodiment.

The present invention is not limited only to the above described embodiments, but also includes all of modifications, application examples and equivalents covered by the idea of the present invention that is prescribed by the claims of the present invention. Therefore, the present invention is not to be taken in a limited sense, and can be applied for another arbitrary technique that belongs to the scope of the present invention.

For example, in the above embodiments, the ignition timing retard is performed in response to the rapid warm-up request (S30 and S230); however, the performance of the ignition timing retard is not requisite for the present invention. In the first embodiment, the reaction state is detected based on the temperature in the exhaust passage 18 upstream of the turbocharger 4, and in the second embodiment, the reaction state is detected based on the fluctuation of the air-fuel ratio in the exhaust gas; however, these processes can be exchanged from each other, and the reaction state maybe detected based on the fluctuation of the air-fuel ratio for the first embodiment, or based on the temperature of the exhaust passage 18 upstream of the turbocharger 4 for the second embodiment.

In the embodiments, the three-way catalyst 21 is employed; however, the present invention can also be applied for various other types of catalysts, especially catalysts for which the heating process for raising the temperature up to the activation temperature is required. Further, in the above embodiments, the present invention is applied to a gasoline internal combustion engine, but can also be applied to an internal combustion engine employing fuel other than gasoline, and such an arrangement is also included in the scope of the present invention.

What is claimed is:

1. An apparatus for controlling an internal combustion engine, comprising:
 a turbocharger including a compressor and a turbine,
 a bypass passage that bypasses an exhaust passage to connect an upstream side of the turbine of the turbocharger to a downstream side thereof,
 a wastegate valve arranged in the bypass passage, a catalyst device arranged in the exhaust passage downstream of the turbine of the turbocharger,
 a temperature sensor that measures a temperature of the exhaust gas in the exhaust passage upstream of the turbine of the turbocharger, and
 a controller programmed to:
  control the internal combustion engine and the wastegate valve,
  set the wastegate valve to a closed state in a case where a warm-up of the catalyst device is requested, and to perform air-fuel ratio oscillation for oscillating an air-fuel ratio so that lean combustion and rich combustion are alternately performed in a case where the temperature in the exhaust passage upstream of the turbine of the turbocharger is beyond a predetermined reference value.

2. The apparatus for controlling an internal combustion engine according to claim 1,
wherein the controller is further programmed to:
   determine a reaction state of rich gas with lean gas on the upstream side of the turbocharger based on at least input from an oxygen sensor, and
   control, during the air-fuel ratio oscillation, an opening degree of the wastegate valve based on the reaction state.

3. The apparatus for controlling an internal combustion engine according to claim 2, wherein the reaction state is dependent on the temperature of the exhaust gas in the exhaust passage on the upstream side of the turbocharger, obtained by said temperature sensor.

4. The apparatus for controlling an internal combustion engine according to claim 2, wherein the reaction state is dependent on a fluctuation of the air-fuel ratio.

5. The apparatus for controlling an internal combustion engine according to claim 1, wherein
   the controller is further programmed to:
      determine a reaction state of rich gas with lean gas on the upstream side of the turbocharger based on at least input from an oxygen sensor, and
      control, during the air-fuel ratio oscillation, an amplitude of the air-fuel ratio based on the reaction state.

6. The apparatus for controlling an internal combustion engine according to claim 5, wherein the reaction state is dependent on the temperature of the exhaust gas in the exhaust passage on the upstream side of the turbocharger, obtained by said temperature sensor.

7. The apparatus for controlling an internal combustion engine according to claim 5, wherein the reaction state is dependent on a fluctuation of the air-fuel ratio.

* * * * *